(12) United States Patent
Jin

(10) Patent No.: US 11,388,281 B2
(45) Date of Patent: Jul. 12, 2022

(54) ADAPTIVE METHOD AND APPARATUS FOR INTELLIGENT TERMINAL, AND TERMINAL

(71) Applicant: BEIJING XIAOMI MOBILE SOFTWARE CO., LTD., Beijing (CN)

(72) Inventor: Xiulu Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/204,891

(22) Filed: Mar. 17, 2021

(65) Prior Publication Data

US 2022/0014617 A1    Jan. 13, 2022

(30) Foreign Application Priority Data

Jul. 13, 2020   (CN) .......................... 202010669506.7

(51) Int. Cl.
*H04M 1/72448* (2021.01)

(52) U.S. Cl.
CPC ............... *H04M 1/72448* (2021.01)

(58) Field of Classification Search
CPC ................................................ H04M 1/72448
See application file for complete search history.

(56) References Cited

U.S. PATENT DOCUMENTS

| 2011/0216093 A1* | 9/2011 | Griffin | ............. H04R 3/12 345/659 |
| 2018/0103317 A1* | 4/2018 | Sassi | ............. H04M 1/6008 |
| 2018/0300038 A1 | 10/2018 | Chun | |

OTHER PUBLICATIONS

European Patent Application No. 21165058.5, extended Search and Opinion dated Sep. 20, 2021, 10 pages.

* cited by examiner

*Primary Examiner* — Yuwen Pan
*Assistant Examiner* — Angelica M Perez
(74) *Attorney, Agent, or Firm* — Lathrop GPM LLP

(57) ABSTRACT

An adaptive method and apparatus for an intelligent terminal, and a terminal are disclosed. The method includes: detecting whether a plurality of screen usage modes for a plurality of applications processed in parallel by a terminal are of same usage mode, wherein the screen usage mode indicates that screen usage parameters for the application tend to be in a landscape screen usage mode or a portrait screen usage mode; in response to detecting that the plurality of screen usage modes for the plurality of applications processed by the terminal in parallel are different usage modes, determining a current screen usage state of the terminal, and adjusting screen usage parameters for an application whose screen usage mode is not consistent with the current screen usage state.

14 Claims, 4 Drawing Sheets

ADAPTIVE METHOD AND APPARATUS FOR INTELLIGENT TERMINAL, AND TERMINAL

CROSS-REFERENCE TO RELATED APPLICATION

This application claims priority to Chinese Patent Application No. 202010669506.7, filed on Jul. 13, 2020, the entire contents of which are incorporated herein by reference for all purposes.

TECHNICAL FIELD

The present disclosure relates to a field of smart phones, and more particularly, to an adaptive method and apparatus for an intelligent terminal, and a terminal.

BACKGROUND

With the promotion of 4G mobile communication, smart phones have more and more powerful functions, and a variety of applications such as games have also emerged. A plurality of tasks may be processed in parallel for users. A landscape screen mode may be used when applications such as games are performed and a portrait screen mode may be used generally during calls.

Relative positions of an audio device of a mobile phone to a user's mouth and ears are very different in the two screen modes (i.e., the landscape screen mode and the portrait screen mode). In general, most mobile phones have two or more microphones. Changes in relative positions of microphones to the user's mouth and ears will result in sub-optimal performance of the audio device, which further leads to a problem that the collected sounds are of poor quality, for example, unstable sounds or even soundless.

SUMMARY

According to a first aspect of the present disclosure, an adaptive method for a terminal is provided. The method includes: detecting whether a plurality of screen usage modes for a plurality of applications processed in parallel by the terminal are of same usage mode, wherein the screen usage mode indicates that screen usage parameters for the application tend to be in a landscape screen usage mode or a portrait screen usage mode; and in response to detecting that the plurality of screen usage modes for the plurality of applications processed by the terminal in parallel are different usage modes, determining a current screen usage state of the terminal, and adjusting screen usage parameters for an application whose screen usage mode is not consistent with the current screen usage state.

According to a second aspect of the present disclosure, an adaptive apparatus for a terminal is provided. The apparatus includes a processor and a memory for storing instructions executable by the processor. The processor is configured to: detect whether a plurality of screen usage modes for a plurality of applications processed in parallel by the terminal are of same usage mode, wherein the screen usage mode indicates that the screen usage parameters for the application tend to be in a landscape screen usage mode or a portrait screen usage mode; determine a current screen usage state of the terminal in response to detecting that the plurality of screen usage modes for the plurality of applications processed by the terminal in parallel are different usage modes; and adjust the screen usage parameters for an application whose screen usage mode is not consistent with the current screen usage state.

According to a third aspect of the present disclosure, a terminal is provided. The terminal may include a gravity sensor, a first microphone, a second microphone and a processor. The gravity sensor is configured to detect a current screen usage state of the terminal. The first microphone is located at the bottom of the terminal. The second microphone is located at the top of the terminal. The processor is configured to detect whether screen usage modes for at least two applications using an audio function processed in parallel by the terminal are of same usage mode, wherein the screen usage mode indicates that screen usage parameters for the application tend to be in a landscape screen usage mode or a portrait screen usage mode; in response to detecting that the screen usage modes are different usage modes, modify screen usage parameters for the application whose screen usage mode is not consistent with the current screen usage state to screen usage parameters consistent with the current screen usage state; and adjust microphone parameters for voice collection according to the current screen usage state.

It should be understood that the above general description and the following detailed description are only exemplary and explanatory, without any limitations to the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification.

DETAILED DESCRIPTION

Figure 1:
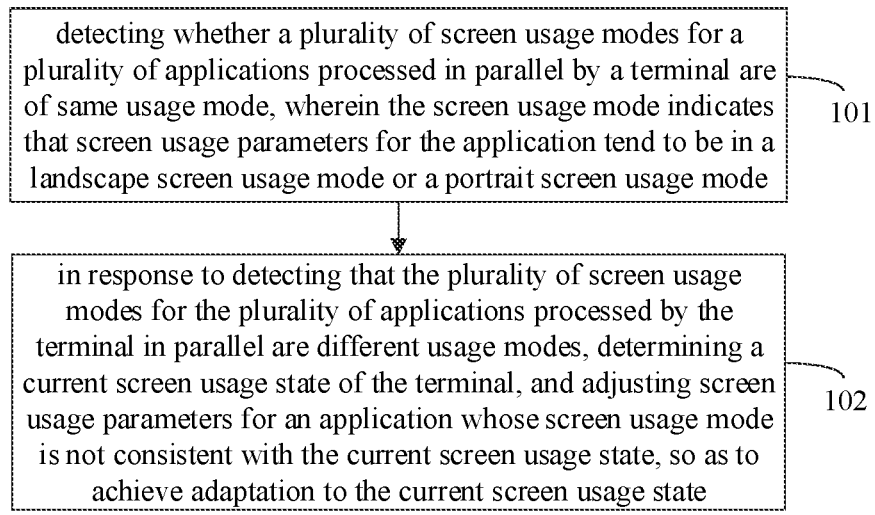
FIG. 1 is a flowchart illustrating an adaptive method for an intelligent terminal according to an exemplary embodiment.

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the present disclosure as detailed in the appended claims.

Relative positions of an audio device of a mobile phone to a user's mouth and ears are very different in the two screen modes (i.e., the landscape screen mode and the portrait screen mode). In general, the mobile phone has two or more microphones. Changes in relative positions of microphones to the user's mouth and ears will result in sub-optimal performance of the audio device, which further leads to a problem that the collected sounds are of poor quality, such as unstable or even soundless.

In addition, in order to obtain better audio collection effects in different usage modes, the user may still need to make calls in the portrait screen mode while applications are performed in the landscape screen mode, which restricts the user's usage modes and affects the user experiences. For example, during a voice over Internet protocol (VOIP) call, where the management of the VOIP call and games are carried out separately as the system generally only handles a single task and the collected voices of the VOIP calls will not be optimized in the games scene, the mobile phone operated in the landscape screen mode still adopts the VOIP call parameters of the portrait screen mode, which causes poor call quality in the landscape screen mode.

Furthermore, the methods in which the mobile phone plays audios are also different, such as through a handset of the mobile phone, an earphone or speaker externally connected to the mobile phone. The sound collection may thus be affected by the external playback sounds with different playback methods. For example, in case that some microphones are close to the external speakers, the sound collection of the microphones may be affected when these speakers are playing.

In order to solve the problems described above, the embodiments of the present disclosure provides an adaptive method for an intelligent terminal. In this method, it is detected whether the screen usage modes for a plurality of applications processed in parallel by the terminal are of same usage mode, a current screen usage state of the terminal is determined in case that the screen usage modes are different, and screen usage parameters for an application whose screen usage mode is not consistent with the current screen usage state are adjusted, so as to achieve adaptation to the current screen usage state. This method is particularly suitable for scenarios where a plurality of applications using the audio function are processed in parallel for the users and the screen usage modes for the plurality of applications are different.

With this method, when the plurality of applications are run in parallel on the terminal for the users, the screen usage parameters for the application may be adaptively adjusted according to the current screen usage state, so that the users have optimal experiences to operate the plurality of applications. For example, when the terminal is operated by the user to play a game in the landscape screen usage mode, the terminal may adaptively adjust portrait screen usage parameters set for making calls (the portrait screen usage mode is generally used for making calls) as landscape screen usage parameters if a VOIP call is connected. In this way, the quality for the VOIP call may be ensured without affecting the user to play a game.

The intelligent terminal herein may be a mobile phone, a PAD, a wearable device, etc.

The present disclosure provides an adaptive method for an intelligent terminal. As illustrated in FIG. 1, this method includes the following blocks 101-102.

In block 101, it is detected whether a plurality of screen usage modes for a plurality of applications processed in parallel by the terminal are of same usage mode. The screen usage mode indicates that screen usage parameters for the application tend to be in a landscape screen usage mode or a portrait screen usage mode.

In block 102, in response to detecting that the plurality of screen usage modes for the plurality of applications processed in parallel by the terminal are different usage modes, a current screen usage state of the terminal is determined, and screen usage parameters for an application whose screen usage mode is not consistent with the current screen usage state are adjusted, so as to achieve adaptation to the current screen usage state.

In block 101, a plurality of applications are usually processed in parallel when the terminal is in operation, and the screen usage modes for these applications may be the same or different. For example, the screen usage parameters indicated by the screen usage modes for some game applications tend to be in the landscape screen usage mode, and the screen usage parameters indicated by the screen usage modes for some call applications tend to be in the portrait screen usage mode. That is, different screen usage parameters are set for different usage modes.

In block 102, it is detected whether the screen usage modes for the plurality of applications processed in parallel by the terminal are the same, and if the screen usage modes are not the same, a current screen usage state of the terminal is determined, i.e., the current screen usage state of the terminal is in a landscape screen usage state or a portrait screen usage state. In this case, since a plurality of (at least two) screen usage modes for a plurality of applications processed in parallel are existed, there are screen usage modes that are not consistent with the current screen usage state. Then, screen usage parameters for an application whose screen usage mode is not consistent with the current screen usage state are adjusted, so as to achieve adaptation to the current screen usage state.

Figure 2:
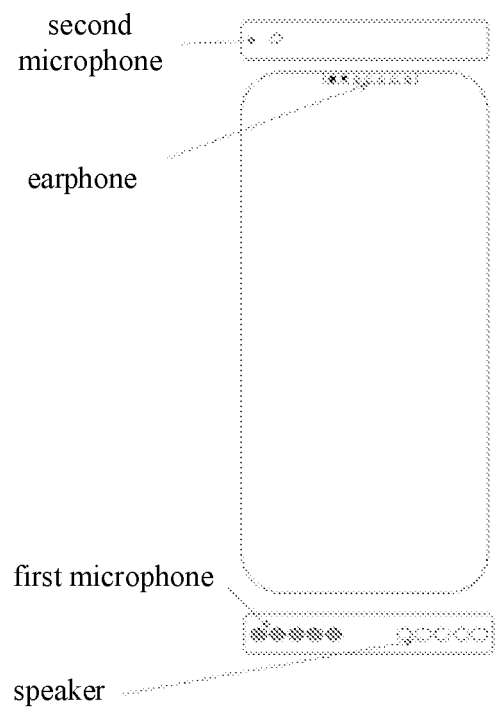
FIG. 2 is a schematic diagram illustrating an intelligent terminal according to an exemplary embodiment.
Figure 3:
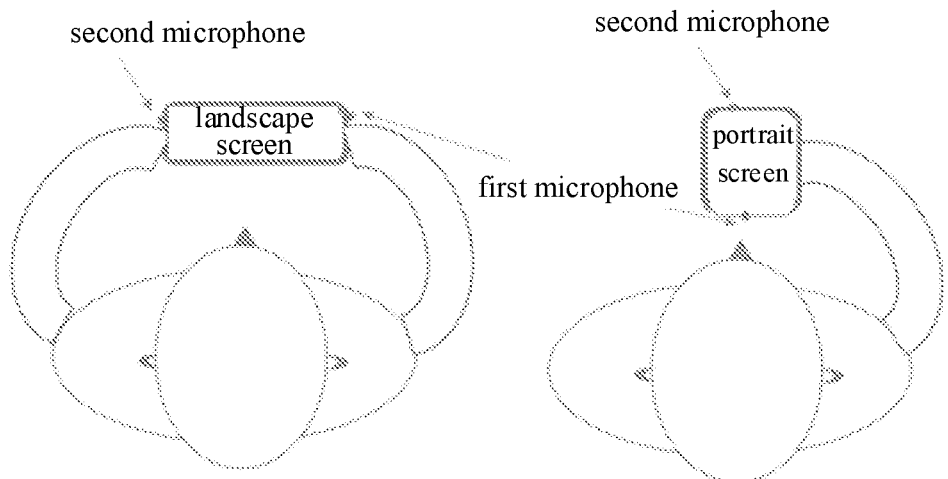
FIG. 3 is a schematic diagram illustrating a landscape screen usage state and a portrait screen usage state according to an exemplary embodiment.

This is because the corresponding screen usage parameters need to be set in different screen usage states to enable the terminal to achieve optimal usage effects, especially when the audio function is used. This is related to the positions of microphones on the terminal. FIG. 2 illustrates a schematic diagram of a terminal usually having two microphones, in which the one at the top of the terminal is a second microphone and the other at the bottom of the terminal is a first microphone. FIG. 3 illustrates the positions of the two microphones respectively in the landscape screen usage mode and the portrait screen usage mode.

As illustrated in FIG. 3, relative positions of the audio device to the mouth and ears in the landscape screen usage mode are very different from those in the portrait screen usage mode. In the landscape screen usage mode, the first microphone and the second microphone are located respectively in the left and right hands with a basically same distance from the mouth. In the portrait screen usage mode, the second microphone is at the top and far from the mouth and the first microphone is at the bottom and close to the mouth. The uplink noise cancellation has strict requirements on the relative positions of microphones to the mouth, so it is necessary to set appropriate noise cancellation parameters for different relative positions of microphones to the mouth, so as to achieve optimal audio effects.

On this basis, it is necessary to adjust the screen usage parameters for the application whose screen usage mode is not consistent with the current screen usage state, so as to achieve adaptation to the current screen usage state.

With this method, when the plurality of applications are run in parallel on the terminal for the users, the screen usage parameters for the application may be adaptively adjusted according to the current screen usage state, so that the users have optimal experiences to operate the plurality of applications.

In an alternative implementation, detecting whether the plurality of screen usage modes for the plurality of applications processed in parallel by the terminal are the same usage mode further includes: detecting whether screen usage modes for at least two applications with audio functions processed in parallel by the terminal are the same usage mode; detecting that the plurality of screen usage modes for the plurality of applications processed by the terminal in parallel are different usage modes includes: detecting that the screen usage modes for at least two applications with audio functions processed in parallel by the terminal are different usage modes; and adjusting the screen usage parameters for the application whose screen usage mode does not conform to the current screen usage state includes: adjusting the screen usage parameters for an application whose screen usage mode is not consistent with the current screen usage state from at least two applications with audio functions processed in parallel. The screen usage parameters include audio parameters.

The adaptive method described above is particularly suitable for a plurality of applications processed in parallel by the terminal served as the applications with audio functions. since relative positions of microphones to the mouth are different in the landscape screen usage mode and the portrait screen usage mode of the terminal as described above with respect to FIG. 2 and FIG. 3, it is necessary to set appropriate screen usage parameters (such as noise cancellation parameters) in order to achieve optimal audio effects.

In an alternative implementation, detecting whether the screen usage modes for at least two applications using the audio function processed in parallel by the terminal are the same usage mode includes: if at least one application running on the terminal being in a state of using the audio function, determining whether screen usage mode for another application that needs to use the audio function is the same as the screen usage mode for the at least one application running on the terminal when it is detected that the another application that needs to use the audio function is started.

With this method, for example, the terminal is operated by the user to play a game in the landscape screen usage mode, the terminal may adaptively adjust portrait screen usage parameters (the portrait screen usage mode is generally used for the call) set for making calls as landscape screen usage parameters if a VOIP call is connected. In this way, the quality for the VOIP call may be ensured without affecting the user to play a game.

In an alternative implementation, the at least two applications using the audio function processed in parallel include a game application and a VOIP application.

In this embodiment, it is an application scenario most commonly used in the present disclosure that the game application and the VOIP application are operated by the user at the same time.

In an alternative implementation, determining the current screen usage state of the terminal includes: obtaining detection data of a gravity sensor in the terminal; and determining the current screen usage state of the terminal according to the detection data.

Figure 4:
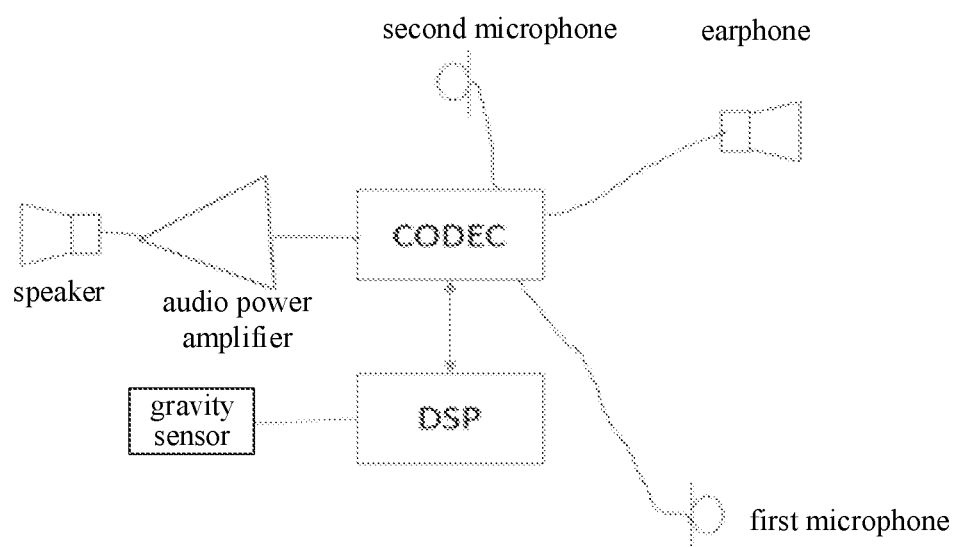
FIG. 4 is a structural schematic diagram illustrating an intelligent terminal according to an exemplary embodiment

In this embodiment, a gravity sensor is configured to determine the current screen usage state of the terminal. FIG. 4 illustrates a schematic diagram of various functional modules in the terminal, including a gravity sensor. The current screen usage state is sent to a digital signal processor DSP through the gravity sensor, and the corresponding screen usage parameters are accordingly set by the DSP. It should be noted that determining the current screen usage state by the detection data of the gravity sensor may be implemented based on a method known to those skilled in the art, which will not be repeated here.

In an alternative implementation, adjusting the screen usage parameters for an application whose screen usage mode is not consistent with the current screen usage state from at least two applications using the audio function processed in parallel, in which the screen usage parameters include audio parameters, includes: modifying the screen usage parameters for the application whose screen usage mode is not consistent with the current screen usage state to screen usage parameters consistent with the current screen usage state; and adjusting microphone parameters for voice collection according to the current screen usage state.

For example, if the current screen usage state of the terminal is in a landscape screen usage state and the screen usage mode for one of applications processed in parallel by the terminal indicates that its screen usage parameters tend to be in a portrait screen usage mode, the screen usage parameters that tend to be in the portrait screen usage mode need to be adjusted as those that tend to be in the landscape screen usage mode in order to achieve optimal audio effects, which includes adjusting microphone parameters, such as setting the noise cancellation parameters in the landscape screen usage mode.

It requires pre-setting screen usage parameters in the landscape screen usage state and the portrait screen usage state, so as to ensure that the voice collection in the two usage states meets objective and subjective standards of 3QUEST noise cancellation (which is a known noise cancellation technique in the art).

In an alternative implementation, adjusting the microphone parameters for voice collection according to the current screen usage state includes: if the current screen usage state is in a portrait screen state, setting a microphone at the top of the terminal as a main microphone and setting a microphone at the bottom of the terminal as an auxiliary microphone; and obtaining a voice signal through a subtraction between an audio signal collected by the auxiliary microphone and an audio signal collected by the main microphone according to a noise cancellation algorithm; if the current screen usage mode is in a landscape screen state, setting a microphone of the terminal far from a speaker as a main microphone and setting a microphone of the terminal adjacent to the speaker as an auxiliary microphone; turning off the auxiliary microphone and determining an audio signal collected by the main microphone as a voice signal according to a noise cancellation algorithm, or obtaining a voice signal through a subtraction between an audio signal collected by the auxiliary microphone and the audio signal collected by the main microphone according to the noise cancellation algorithm.

Since the first microphone is close to the speaker, there may be greater echoes, the first microphone is generally configured as the auxiliary microphone and the second microphone is configured as the main microphone.

For example, when the screen usage mode for the application is set to the portrait screen usage mode, it indicates that the terminal is in the portrait screen state, i.e., the user uses the terminal in the portrait screen mode. At this time, the user's mouth is closer to the microphone at the bottom of the terminal, so the microphone at the bottom of the terminal is configured as the main microphone to better collect user's voices and the microphone at the top of the terminal is configured as the auxiliary microphone to collect background noises. According to the noise cancellation algorithm, a voice signal is obtained through a subtraction between the audio signal collected by the auxiliary microphone and the audio signal collected by the main microphone.

For another example, when the screen usage mode for the application is set to the landscape screen usage mode, it indicates that the terminal is in the landscape screen state, i.e., the user uses the terminal in the landscape screen mode. At this time, the distance between the user's mouth and the microphone at the top of the terminal is basically the same as the distance between the user's mouth and the microphone at the bottom of the terminal. It is considered that sounds may be played through the speaker of the terminal in the landscape screen usage mode, for example the game sounds will be played through the speaker when using a game application. At this time, the microphone will be interfered by the speaker. The closer the microphone is to the speaker, larger interference will be received. Therefore, a microphone far from the speaker is selected as a main microphone for voice collection and a microphone close to the speaker is selected as an auxiliary microphone to help remove noise.

In addition, since the auxiliary microphone is close to the speaker, the collected audio is mainly the sound from the speaker. Therefore, an audio signal collected by the auxiliary microphone is subtracted from an audio signal collected by the main microphone to obtain a voice signal. Alternatively, the auxiliary microphone may be off and the audio signal collected by the main microphone is determined as the voice signal.

Figure 5:
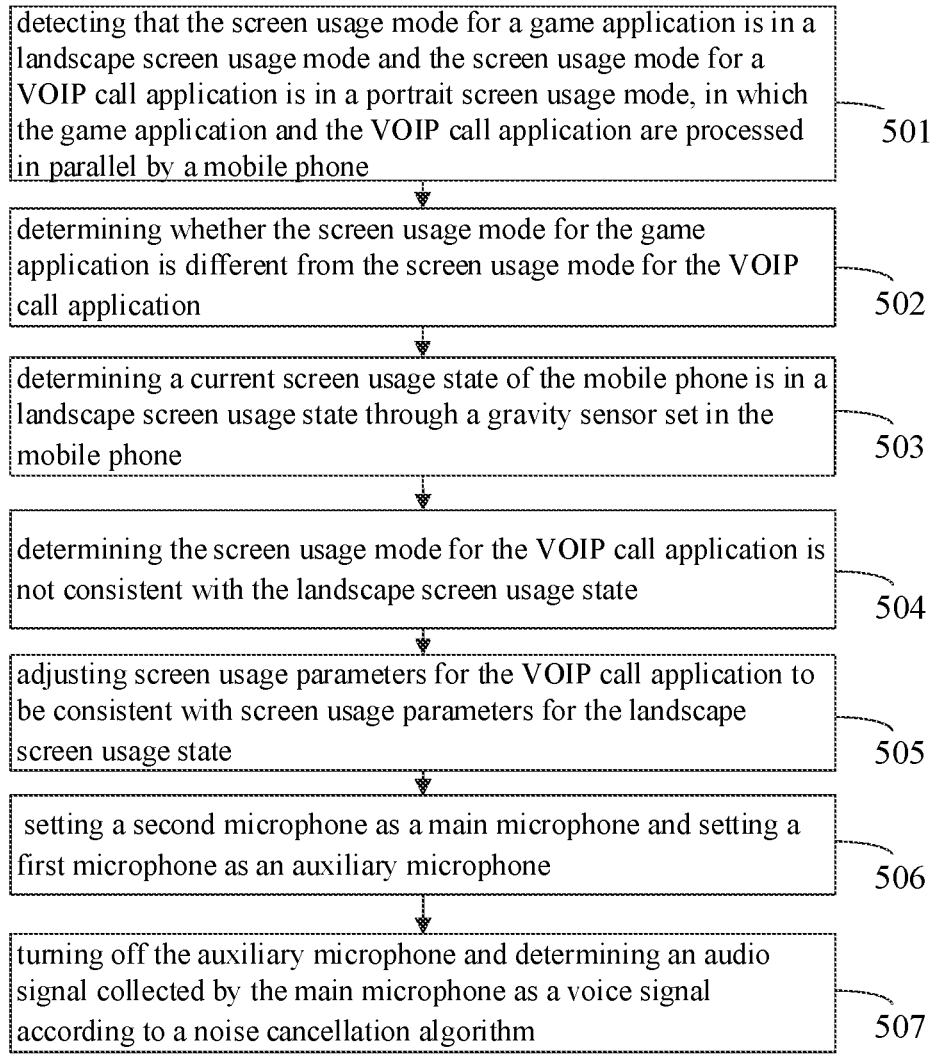
FIG. 5 is a flowchart illustrating an adaptive method for an intelligent terminal according to an exemplary embodiment.

Specific embodiments according to the present disclosure are described in detail below. In this embodiment, the terminal is a mobile phone on which two microphones are provided. A first microphone is located at the bottom of the mobile phone and a second microphone is located at the top of the mobile phone, as illustrated in FIG. 2. The application scenario for this embodiment is that the user is playing a game in the landscape screen mode while a VOIP phone is connected. As illustrated in FIG. 5, this embodiment includes the following blocks 501-507.

In block 501, it is detected that the screen usage mode for a game application is in a landscape screen usage mode and the screen usage mode for a VOIP call application is in a portrait screen usage mode, in which the game application and the VOIP call application are processed in parallel by a mobile phone.

In block 502, it is determined whether the screen usage mode for the game application is different from the screen usage mode for the VOIP call application.

In block 503, it is determined that a current screen usage state of the mobile phone is in a landscape screen usage state through a gravity sensor set in the mobile phone.

In block 504, it is determined that the screen usage mode for the VOIP call application is not consistent with the landscape screen usage state.

In block 505, screen usage parameters for the VOIP call application are adjusted to be consistent with screen usage parameters for the landscape screen usage state.

In block 506, a second microphone is set as a main microphone and a first microphone is set as an auxiliary microphone.

In block 507, the auxiliary microphone is turned off and an audio signal collected by the main microphone is determined as a voice signal according to a noise cancellation algorithm.

Figure 6:
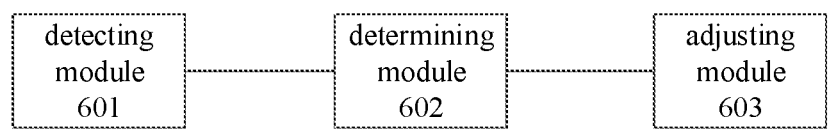
FIG. 6 is a block diagram illustrating an adaptive apparatus for an intelligent terminal according to an exemplary embodiment.

The present disclosure also provides an adaptive apparatus for an intelligent terminal, the structure of which is illustrated in FIG. 6. The apparatus includes a detecting module 601, a determining module 602 and an adjusting module 603.

The detecting module 601 is configured to detect whether a plurality of screen usage modes for a plurality of applications processed in parallel by the terminal are of same usage mode. The screen usage mode indicates that the screen usage parameters for the application tend to be in a landscape screen usage mode or a portrait screen usage mode.

The determining module 602 is configured to determine a current screen usage state of the terminal in response to detecting that the plurality of screen usage modes for the plurality of applications processed by the terminal in parallel are different usage modes.

The adjusting module 603 is configured to adjust the screen usage parameters for an application whose screen usage mode is not consistent with the current screen usage state, so as to achieve adaptation to the current screen usage state.

In an alternative implementation, the detecting module 601 is further configured to screen usage modes for at least two applications using an audio function processed in parallel by the terminal are the same usage mode. The determining module 602 is further configured to determine the current screen usage state of the terminal in response to detecting that the screen usage modes for at least two applications using the audio function processed in parallel by the terminal are different usage modes. The adjusting module 603 is further configured to adjust screen usage parameters for an application whose screen usage mode is not consistent with the current screen usage state from at least two applications using the audio function processed in parallel, in which the screen usage parameters include audio parameters.

In an alternative implementation, the detecting module 601 is further configured to: in response to at least one application running on the terminal being in a state of using the audio function, determine whether screen usage mode for another application that needs to use the audio function is the same as the screen usage mode for the at least one application running on the terminal when it is detected that the another application that needs to use the audio function is started.

In an alternative implementation, the at least two applications using audio function processed in parallel include a game application and a voice over Internet protocol VOIP application.

In an alternative implementation, the determining module 602 is further configured to: obtain detection data of a gravity sensor in the terminal; and determine the current screen usage state of the terminal according to the detection data.

In an alternative implementation, the adjusting module 603 is further configured to: modify the screen usage parameters for the application whose screen usage mode is not consistent with the current screen usage state to screen usage parameters consistent with the current screen usage state;

and adjust microphone parameters for voice collection according to the current screen usage state.

In an alternative implementation, the adjusting module 603 is further configured to: in response to the current screen usage state being in a portrait screen state, set a microphone at the top of the terminal as a main microphone and set a microphone at the bottom of the terminal as an auxiliary microphone; and obtain a voice signal through a subtraction between an audio signal collected by the auxiliary microphone and an audio signal collected by the main microphone according to a noise cancellation algorithm; in response to the current screen usage mode being in a landscape screen state, set a microphone of the terminal far from a speaker as a main microphone and set a microphone of the terminal adjacent to the speaker as an auxiliary microphone; turn off the auxiliary microphone and determine an audio signal collected by the main microphone as a voice signal according to a noise cancellation algorithm, or obtain a voice signal through a subtraction between an audio signal collected by the auxiliary microphone and the audio signal collected by the main microphone according to the noise cancellation algorithm.

The apparatus described above may be integrated in a terminal such as a smart phone to implements respective functions. Regarding the apparatus in the embodiment described above, the specific manner in which each module performs operation has been described in detail in the method embodiments, which will not be repeated herein.

The embodiment of the present disclosure provides an adaptive method for an intelligent terminal. In this method, it is detected whether the screen usage modes for a plurality of applications processed in parallel by a terminal are of same usage mode, a current screen usage state of the terminal is determined when the screen usage modes are different, and screen usage parameters for an application whose screen usage mode is not consistent with the current screen usage state are adjusted, so as to achieve adaptation to the current screen usage state. This method is particularly suitable for scenarios where a plurality of applications using the audio function are processed in parallel for the users and the screen usage modes for the plurality of applications are different. Without the addition of extra hardware, the method solves a problem that voices are collected with poor effects, realizing voice collection of high quality and easy to operate.

With this method, when the plurality of applications are run in parallel on the terminal for the users, the screen usage parameters for the application may be adaptively adjusted according to the current screen usage state, so that the users have optimal experiences to operate the plurality of applications. For example, when the terminal is operated by the user to play a game in the landscape screen usage mode, the terminal may adaptively adjust portrait screen usage parameters set for making calls as landscape screen usage parameters if a VOIP call is connected. In this way, the quality for the VOIP call may be ensured without affecting the user to play a game.

Figure 7:
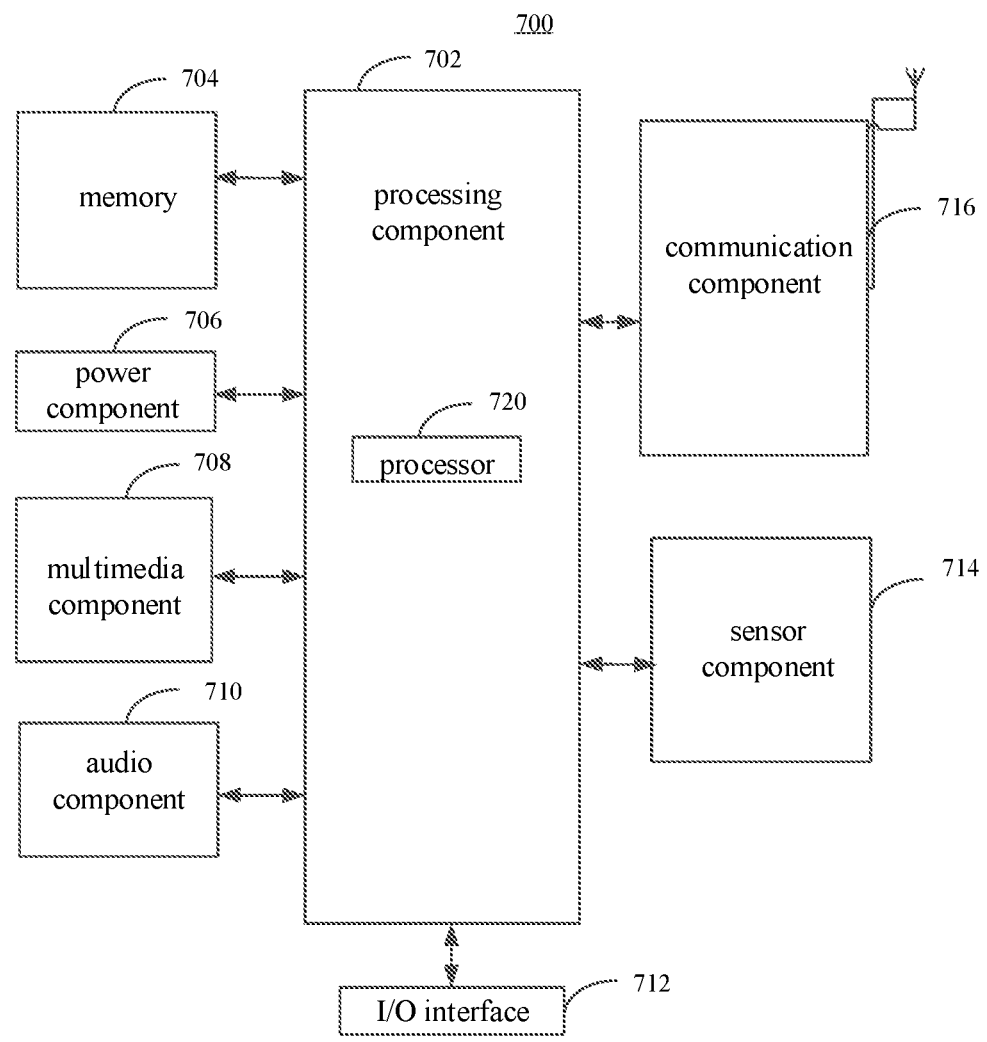
FIG. 7 is a block diagram illustrating an adaptive device for an intelligent terminal according to an exemplary embodiment.

FIG. 7 is a block diagram illustrating an adaptive device for an intelligent terminal according to an exemplary embodiment. The device 700 may be a mobile phone, a computer, a digital broadcasting terminal, a messaging device, a game console, a tablet device, a medical device, a fitness equipment, a personal digital assistant, etc.

Referring to FIG. 7, the apparatus 700 may include one or more of the following components: a processing component 702, a memory 704, a power supply component 706, a multimedia component 708, an audio component 710, an input/output (I/O) interface 712, a sensor component 714, and a communication component 716.

The processing component 702 typically controls the overall operations of the device 700, such as the operations associated with display, telephone calls, data communications, camera operations, and recording operations. The processing component 702 may include one or more processors 720 to execute instructions to perform all or part of the steps of the above described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support operations in the device 700. Examples of such data include instructions for any application or method operating on the device 700, contact data, phone book data, messages, pictures, videos, etc.

The memory 704 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 706 provides power to various components of the device 700. The power supply component 706 may include a power management system, one or more power sources, and other components associated with the generation, management, and distribution of power for the device 700.

The multimedia component 708 includes a screen that provides an output interface between the device 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and rear camera may be a fixed optical lens system or have focus and optical zoom capability.

The audio component 710 is configured to output and/or input audio signals. For example, the audio component 710 includes a microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and the peripheral interface module. The peripheral interface module may be a keyboard, a click wheel, a button, and the like. These buttons may include but are not limited to, a home button, a volume button, a starting button, and a locking button.

The sensor component 714 includes one or more sensors for providing the device 700 with various aspects of state evaluation. For example, the sensor component 714 may detect an open/closed state of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G or 3G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the device 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods.

In exemplary embodiments, there is also provided a non-transitory computer-readable storage medium including instructions, such as the memory 704, executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having instructions stored thereon is provided. When the instructions are executed by a processor of a mobile terminal, an adaptive method for an intelligent terminal is executed by the mobile terminal, the method comprising: detecting whether a plurality of screen usage modes for a plurality of applications processed in parallel by a terminal are a same usage mode, wherein the screen usage mode indicates that screen usage parameters for the application tend to be in a landscape screen usage mode or a portrait screen usage mode; and in response to detecting that the plurality of screen usage modes for the plurality of applications processed by the terminal in parallel are different usage modes, determining a current screen usage state of the terminal, and adjusting screen usage parameters for an application whose screen usage mode is not consistent with the current screen usage state, so as to achieve adaptation to the current screen usage state.

Those skilled in the art will easily think of other embodiments of the present disclosure after considering the description and practicing the invention disclosed herein. The present disclosure is intended to cover any variations, uses, or adaptive changes of the present invention which follow the general principles of the present invention and include common knowledge or conventional technical means in the art not disclosed in the present disclosure. The description and the embodiments are to be regarded as exemplary only, and the true scope and spirit of the present disclosure are indicated in the following claims.

It should be understood that the present invention is not limited to the precise structure described above and shown in the drawings, and various modifications and changes may be made without departing from its scope. The scope of the claimed invention is only limited by the appended claims.

What is claimed is:

1. An adaptive method for an intelligent terminal, the method comprising:
   detecting whether screen usage modes for at least two applications using an audio function processed in parallel by the intelligent terminal are of same usage mode, wherein the screen usage mode indicates that screen usage parameters for the application are in a landscape screen usage mode or a portrait screen usage mode; and
   in response to detecting that the screen usage modes for the at least two applications are different usage modes, determining a current screen usage state of the intelligent terminal;
   determining an application whose screen usage mode is not consistent with the current screen usage state among the at least two applications;
   modifying screen usage parameters of the application to screen usage parameters corresponding to the current screen usage state, in which the screen usage parameters include audio parameters; and
   adjusting microphone parameters for voice collection based on the current screen usage state.

2. The method of claim 1, wherein detecting whether the screen usage modes for at least two applications using the audio function processed in parallel by the intelligent terminal are the same usage mode comprises:
   in response to at least one application running on the intelligent terminal being in a state of using the audio function, and in response to detecting that another application that needs to use the audio function is started, determining whether the screen usage mode for said another application that needs to use the audio function is the same as the screen usage mode for the at least one application running on the intelligent terminal.

3. The method of claim 1, wherein the at least two applications using the audio function processed in parallel comprise a game application and a voice over Internet protocol (VOIP) application.

4. The method of claim 1, wherein determining the current screen usage state of the intelligent terminal comprises:
   obtaining detection data of a gravity sensor in the intelligent terminal; and
   determining the current screen usage state of the intelligent terminal according to the detection data.

5. The method of claim 1, wherein adjusting the microphone parameters for voice collection based on the current screen usage state comprises:

in response to the current screen usage state being in a portrait screen state, determining a voice signal through a subtraction between an audio signal collected by a microphone at the top of the intelligent terminal and an audio signal collected by a microphone at the bottom of the intelligent terminal according to a noise cancellation algorithm;

in response to the current screen usage mode being in a landscape screen state, turning off a microphone adjacent to a speaker and determining an audio signal collected by a microphone far from the speaker as a voice signal according to a noise cancellation algorithm, or determining a voice signal through a subtraction between an audio signal collected by the microphone adjacent to the speaker and the audio signal collected by the microphone far from the speaker according to the noise cancellation algorithm.

6. An adaptive apparatus for an intelligent terminal, the apparatus comprising:

a processor; and a memory for storing instructions executable by the processor;

wherein the processor is configured to:

detect whether screen usage modes for at least two applications using an audio function processed in parallel by the intelligent terminal are of same usage mode, wherein the screen usage mode indicates that screen usage parameters for the application are in a landscape screen usage mode or a portrait screen usage mode;

determine a current screen usage state of the intelligent terminal in response to detecting that the screen usage modes for the at least two applications are different usage modes;

determine an application whose screen usage mode is not consistent with the current screen usage state among the at least two applications;

modify screen usage parameters of the application to screen usage parameters corresponding to the current screen usage state, in which the screen usage parameters include audio parameters; and adjust microphone parameters for voice collection based on the current screen usage state.

7. The apparatus of claim 6, wherein the processor is further configured to:

in response to at least one application running on the intelligent terminal being in a state of using the audio function, and in response to detecting that another application that needs to use the audio function is started, determine whether the screen usage mode for said another application that needs to use the audio function is the same as the screen usage mode for the at least one application running on the intelligent terminal.

8. The apparatus of claim 6, wherein the at least two applications using audio function processed in parallel comprise a game application and a voice over Internet protocol (VOIP) application.

9. The apparatus of claim 6, wherein the processor is further configured to:

obtain detection data of a gravity sensor in the intelligent terminal; and determine the current screen usage state of the intelligent terminal according to the detection data.

10. The apparatus of claim 6, wherein the processor is further configured to:

in response to the current screen usage state being in a portrait screen state, determine a voice signal through a subtraction between an audio signal collected by a microphone at the top of the intelligent terminal and an audio signal collected by a microphone at the bottom of the intelligent terminal according to a noise cancellation algorithm;

in response to the current screen usage mode being in a landscape screen state, turn off the a microphone adjacent to a speaker and determine an audio signal collected by a microphone far from the speaker as a voice signal according to a noise cancellation algorithm, or determine a voice signal through a subtraction between an audio signal collected by the microphone adjacent to the speaker and the audio signal collected by the microphone far from the speaker according to the noise cancellation algorithm.

11. An intelligent terminal, comprising:

a gravity sensor, configured to detect a current screen usage state of the intelligent terminal;

a first microphone at the bottom of the intelligent terminal;

a second microphone at the top of the intelligent terminal; and a processor, configured to detect whether screen usage modes for at least two applications using an audio function processed in parallel by the intelligent terminal are of same usage mode, wherein the screen usage mode indicates that screen usage parameters for the application are in a landscape screen usage mode or a portrait screen usage mode;

in response to detecting that the screen usage modes for the at least two applications are different usage modes, determine an application whose screen usage mode is not consistent with the current screen usage state among the at least two applications;

modify screen usage parameters of the application to screen usage parameters corresponding to the current screen usage state, in which the screen usage parameters include audio parameters; and adjust microphone parameters for voice collection according to the current screen usage state.

12. The intelligent terminal of claim 11, wherein the first microphone is configured to collect a first audio signal and the second microphone is configured to collect a second audio signal; and wherein the processor is further configured to:

in response to the current screen usage state being in a portrait screen state, determine a voice signal through a subtraction between the first and second audio signal according to a noise cancellation algorithm;

in response to the current screen usage mode being in a landscape screen state, turn off the first microphone and determine the second audio signal as a voice signal according to a noise cancellation algorithm, or determine a voice signal through a subtraction between the first and second audio signal according to the noise cancellation algorithm.

13. The intelligent terminal of claim 11, wherein the processor is further configured to in response to at least one application running on the intelligent terminal being in a state of using the audio function, and in response to detecting that another application that needs to use the audio function is started, determine whether the screen usage mode for the another application that needs to use the audio function is the same as the screen usage mode for the at least one application running on the intelligent terminal.

14. The intelligent terminal of claim 11, wherein the at least two applications using audio function processed in parallel comprise a game application and a voice over Internet protocol (VOIP) application.

\* \* \* \* \*